United States Patent
Wang et al.

(10) Patent No.: US 7,415,505 B2
(45) Date of Patent: Aug. 19, 2008

(54) SYSTEM AND METHOD FOR ELECTRONIC EVENT LOGGING

(75) Inventors: Gonggian Wang, Shenzhen (CN); Tang He, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 742 days.

(21) Appl. No.: 10/829,887

(22) Filed: Apr. 21, 2004

(65) Prior Publication Data

US 2005/0010929 A1    Jan. 13, 2005

(30) Foreign Application Priority Data

Jun. 20, 2003    (TW) ............................... 92116774 A

(51) Int. Cl.
G06F 15/16    (2006.01)
(52) U.S. Cl. ..................... 709/207; 709/206; 714/4; 714/15; 714/25; 714/48
(58) Field of Classification Search .............. 709/206, 709/207, 224; 714/4, 15, 25, 48
See application file for complete search history.

(56) References Cited

U.S. PATENT DOCUMENTS

| | | | |
|---|---|---|---|
| 5,799,206 A * | 8/1998 | Kitagawa et al. .............. 710/36 |
| 5,857,190 A | 1/1999 | Brown | |
| 6,769,079 B1 * | 7/2004 | Currey et al. ................. 714/45 |
| 7,072,963 B2 * | 7/2006 | Anderson et al. ........... 709/225 |
| 7,185,075 B1 * | 2/2007 | Mishra et al. ............... 709/223 |
| 2003/0065764 A1 * | 4/2003 | Capers et al. ............... 709/224 |

FOREIGN PATENT DOCUMENTS

| | | |
|---|---|---|
| TW | 508937 | 11/2002 |
| TW | 522320 | 3/2003 |
| TW | 526669 | 4/2003 |
| TW | 528951 | 4/2003 |

* cited by examiner

*Primary Examiner*—Michael Won
(74) *Attorney, Agent, or Firm*—Wei Te Chung

(57) ABSTRACT

An event logging system (5) includes one or more message sources for generating messages, an event logging library (54) for formatting the messages, a local event logging daemon (57) for distributing the messages, and one or more message destinations for receiving the messages. The local event logging daemon distributes the messages from said message sources to said message destinations. The message sources include one or more of an application (50), a hook (51), a kernel module (56), an internal buffer (59) and a remote event logging daemon (58). The message destinations include one or more of said hook, said internal buffer, said remote event logging daemon, a file system (52) and a mail system (53). The event logging system further includes a kernel logging daemon (55) for transmitting the messages from said kernel module to the event logging library. A related method for logging the messages is also provided.

17 Claims, 5 Drawing Sheets

SYSTEM AND METHOD FOR ELECTRONIC EVENT LOGGING

BACKGROUND OF THE INVENTION

1. Field of the Invention

The present invention relates to a computer-enabled event logging system and method, and particularly to an event logging system and method adapted to different communication devices.

2. Description of Related Art

With the development of electronic network technology, communication devices such as bridges, switches, routers and gateways have proliferated. Users access a local area network (LAN) such as an intranet or a wide area network (WAN) such as the Internet by use of the communication devices. Consequently, communication devices play a very important role in network communications. If any one of communicating devices in a network malfunctions, the entire network can break down. In addition, computer hackers frequently attack a destination device/system/network via the communication devices thereof. The communication devices are liable to be used as tools for invasion by hackers.

In order to protect a network from the above-mentioned problems, a conventional approach is building up an event logging system adapted to the communication devices. The event logging system logs events that happen to the communication devices every day by employing special software. With the event logging system, network administrators are able to not only monitor performance and statuses of the communication devices, but also track invasion by hackers. Thus the event logging system is very important for maintaining the stability and security of the communication devices.

Conventional event logging systems log events that happen to the communicating devices every day, and the resulting collection of logged events can build up quickly. Memory is rapidly expended, and maintenance costs are correspondingly high. The event logging system may become fully occupied by relatively unimportant events, and thus fail to log very important events as they happen. What is needed is an event logging system and method which can log events according to priority levels thereof.

SUMMARY OF THE INVENTION

Accordingly, a primary object of the present invention is to provide an event logging system that can log events according to a priority level of a logging message by modifying a configuration file.

Another object of the present invention is to provide a method for logging messages in an event logging system, the logging messages comprising priority levels.

In order to fulfill the above-mentioned primary object, the present invention provides an event logging system for logging messages. The event logging system comprises one or more message sources for generating the messages, an event logging library for formatting the messages, a local event logging daemon for distributing the messages, and one or more message destinations for receiving the messages. The local event logging daemon distributes the messages from said message sources to said message destinations. Said message sources comprise any one or more of an application, a hook, a kernel module, an internal buffer, and a remote event logging daemon. Said message destinations comprise any one or more of a hook, an internal buffer, a remote event logging daemon, a file system, and a mail system. The event logging system further comprises a kernel logging daemon for transmitting the messages from said kernel module to the event logging library.

In order to fulfill the other above-mentioned object, the present invention provides a method for logging messages. The method comprises the following steps: (a) one or more message sources transmitting the messages; (b) a local event logging daemon receiving the messages; and (c) the local event logging daemon distributing said messages to one or more message destinations. The message sources comprise any one or more of an application, a hook, a kernel module, an internal buffer, and a remote event logging daemon. The message destinations comprise any one or more of said hook, said internal buffer, said remote event logging daemon, a file system, and a mail system.

Unlike a conventional event logging system which logs each event that happens to communication devices every day, the system and method of the present invention can change the priority levels of the messages by modifying the configuration file in order to ensure logging of all important events.

Other objects, advantages and novel features of the present invention will become more apparent from the following detailed description when taken in conjunction with the accompanying drawings, in which:

DETAILED DESCRIPTION OF THE INVENTION

Figure 1:
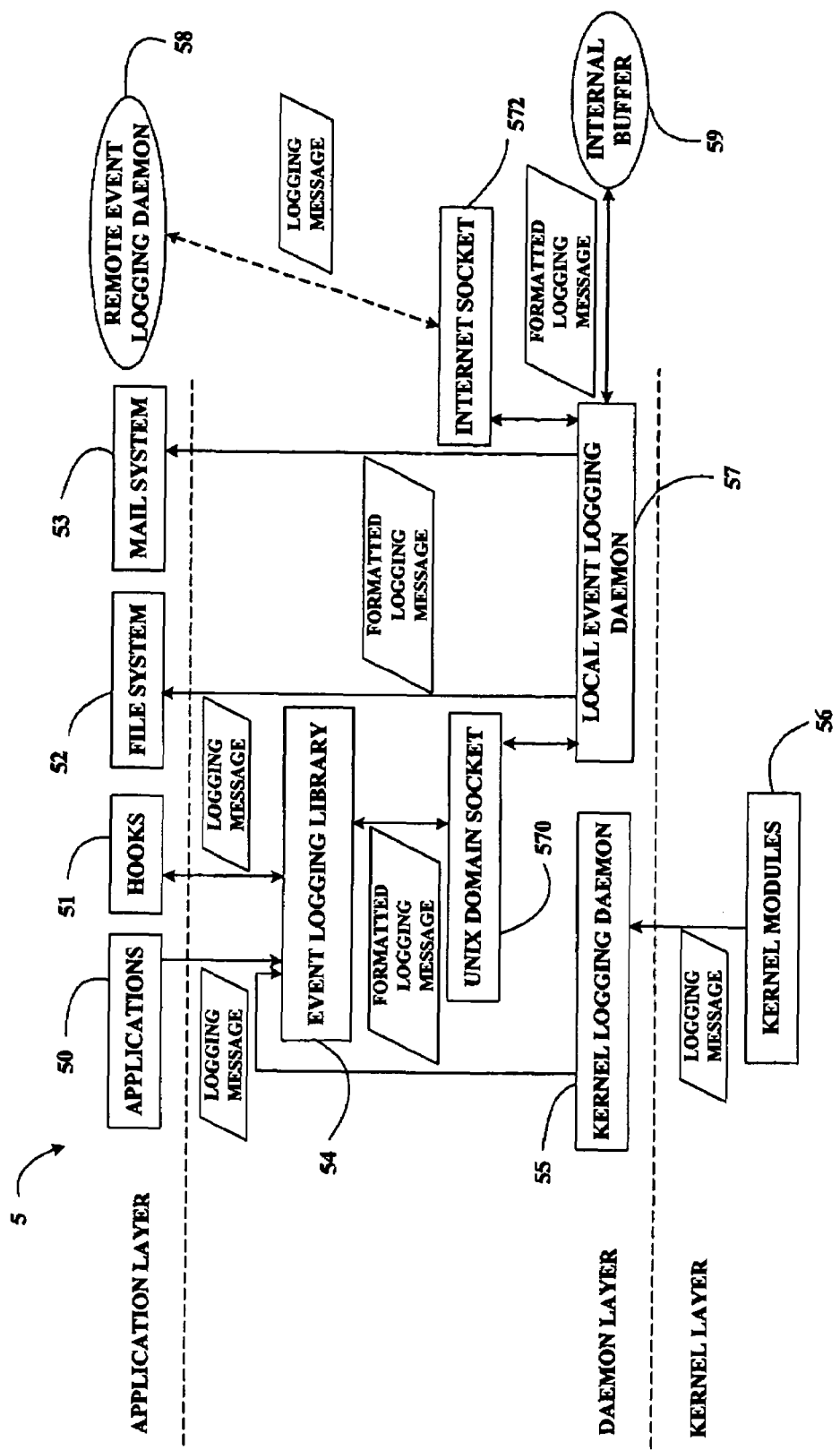
FIG. 1 is a data flow chart of an event logging system according to the present invention.

FIG. 1 is a data flow chart of an event logging system 5 according to the present invention. The event logging system 5 is a Linux-based embedded software system. The event logging system 5 can be defined as comprising three layers: an application layer, a daemon layer, and a kernel layer. The application layer comprises a plurality of applications 50, a plurality of hooks 51, a file system 52, a mail system 53, and a remote event logging daemon 58. The applications 50 are message sources. The file system 52 and the mail system 53 are message destinations. The hooks 51 and the remote event logging daemon 58 may be message sources as well as message destinations. The components of the daemon layer are primarily for receiving the logging messages transmitted from the message sources, and for distributing the logging messages to the message destinations. The daemon layer comprises an event logging library 54, a kernel logging daemon 55, a local event logging daemon 57, and an internal buffer 59. The local event logging daemon 57 can dynamically set up a UNIX domain socket 570 or an Internet socket 572 according to different requirements. The internal buffer 59 is for storing formatted logging messages, and is a message source as well as a message destination. The kernel layer comprises a plurality of kernel modules 56 that are provided as message sources.

In the preferred embodiment of the present invention, each formatted logging message has the following format:
time:<fac:fac_no><pri:priv_no><type:type_no>:<file:filename>:log_msg.

"Time" is an original time when the logging message is generated. "Type" indicates an error type. The default value of "type" is "0." "File" is used for describing the address where the logging message is generated. "Log_msg" records a content of the logging message which a user may need to browse. "Fac" is the message source. "Pri" represents the priority level of the logging message, which is used to determine an order of displaying the logging messages. Table 1 shows various message sources and corresponding descriptions thereof. Table 2 lists some messages' keywords and corresponding UNIX definitions thereof, in order of high priority level to low priority level.

TABLE 1

| Facility Type Keyword | Description |
| --- | --- |
| Daemon | Indicates the system daemon |
| Kern | Indicates the kernel modules |
| Local0 | FTP logging message |
| Local1 | HTTP logging message |
| Local2 | SMTP logging message |
| Local3 | IDS logging information |
| Syslog | Indicates the system log |
| User | Indicates user process |

TABLE 2

| Keyword | Priority Level | Description | Syslog Definition |
| --- | --- | --- | --- |
| Emergencies | 0 | System unusable | LOG_EMERG |
| Alerts | 1 | Immediate action needed | LOG-ALERT |
| Critical | 2 | Critical conditions | LOG_CRIT |
| Errors | 3 | Error conditions | LOG_ERR |
| Warnings | 4 | Warning conditions | LOG_WARNING |
| Notifications | 5 | Normal but significant conditions | LOG_NOTICE |
| Informational | 6 | Informational messages only | LOG_INFO |
| Debugging | 7 | Debugging messages | LOG_DEBUG |

When the event logging system 5 operates, the message sources transmit the logging messages. The data flow in the event logging system 5 varies according to different message sources. If the message sources are the applications 50, the hooks 51, or the kernel modules 56, the message sources select a message destination and a priority level of the logging message, and then transmit the logging message to the event logging library 54. After receiving the logging message, the event logging library 54 formats it, and then transmits the formatted logging message via the UNIX domain socket 570 set up by the local event logging daemon 57. According to a preconfigured configuration file (not shown), the local event logging daemon 57 transmits the formatted logging message to the selected message destination, such as the file system 52 or the internal buffer 59. When a users needs to browse the formatted logging message, the event logging system 5 retrieves the formatted logging message from the selected message destination, and then transmits the formatted logging message to the user. If the message sources are the kernel modules 56, the kernel modules 56 transmit the logging message to the event logging library 54 by way of the kernel logging daemon 55.

If the message source is the remote event logging daemon 58, the remote event logging daemon 58 selects a message destination and a priority level of the logging message, and then transmits the logging message to the local event logging daemon 57 via the Internet socket 572 set up by the local event logging daemon 57. After receiving the logging message, according to the configuration file, the local event logging daemon 57 transmits the logging message to the selected message destination, such as the file system 52 or the internal buffer 59. When a user needs to browse the formatted logging message, the event logging system 5 retrieves the formatted logging message from the selected message destination, and then transmits the formatted logging message to the user.

If the message source is the internal buffer 59 for storing the formatted logging message, the internal buffer 59 transmits the formatted logging message to the local event logging daemon 57 directly. After receiving the formatted logging message, according to the configuration file, the local event logging daemon 57 transmits the formatted logging message to the selected message destination, such as the file system 52 or the mail system 53. When a user needs to browse the formatted logging message, the event logging system 5 retrieves the formatted logging message from the selected message destination, and then transmits the formatted logging message to the user.

In the preferred embodiment of the present invention, the data flow of distributing the logging messages varies according to the different message destinations. If the message destination is the file system 52, or a console (not shown), the local event logging daemon 57 writes the logging message to the message destination directly. If the message destination is the internal buffer 59, the local event logging daemon 57 stores the logging message to the message destination directly. If the message destination is a user (not shown), the local event logging daemon 57 transmits an e-mail to the message destination by using a Linux mail tool. If the message destination is the hooks 51, the local event logging daemon 57 transmits the logging message to the message destination via a UNIX domain socket 570. If the message destination is the remote event logging daemon 58, the local event logging daemon 57 transmits the logging message to the message destination via an Internet socket 572.

In the preferred embodiment of the present invention, the configuration file has the following format:
Facility.Severity Actions.

"Facility" indicates which message source generates the logging message, and may be one of the keywords listed in Table 1. The default keyword of the "Facility" is "*" which means no facility. "Severity" indicates the priority level of the logging message, and may be one of the keywords listed in Table 2. "Actions" indicates how to deal with the logging message, and may be one of the actions listed in Table 3.

TABLE 3

| Actions | Description |
| --- | --- |
| @hostname | Remote host name |
| /dev/tty_name | Tty file |
| | pipe_name | Named pip |
| M: | Internal buffer |
| S: | Special UNIX domain socket for hook |
| User_name | Some users |
| * | All users |

The configuration file is preconfigured by a user, and specifies that each logging message is transmitted to the message destination appointed by "Actions." The logging message is generated by "Facility" and its priority level is "Severity." The user can modify the configuration file directly, in order to ensure that the logging message is obtained by the appointed message destination. When registering the hooks 51, the user can also modify the configuration file via an application program interface (API) in order to designate the message destination.

Figure 2:
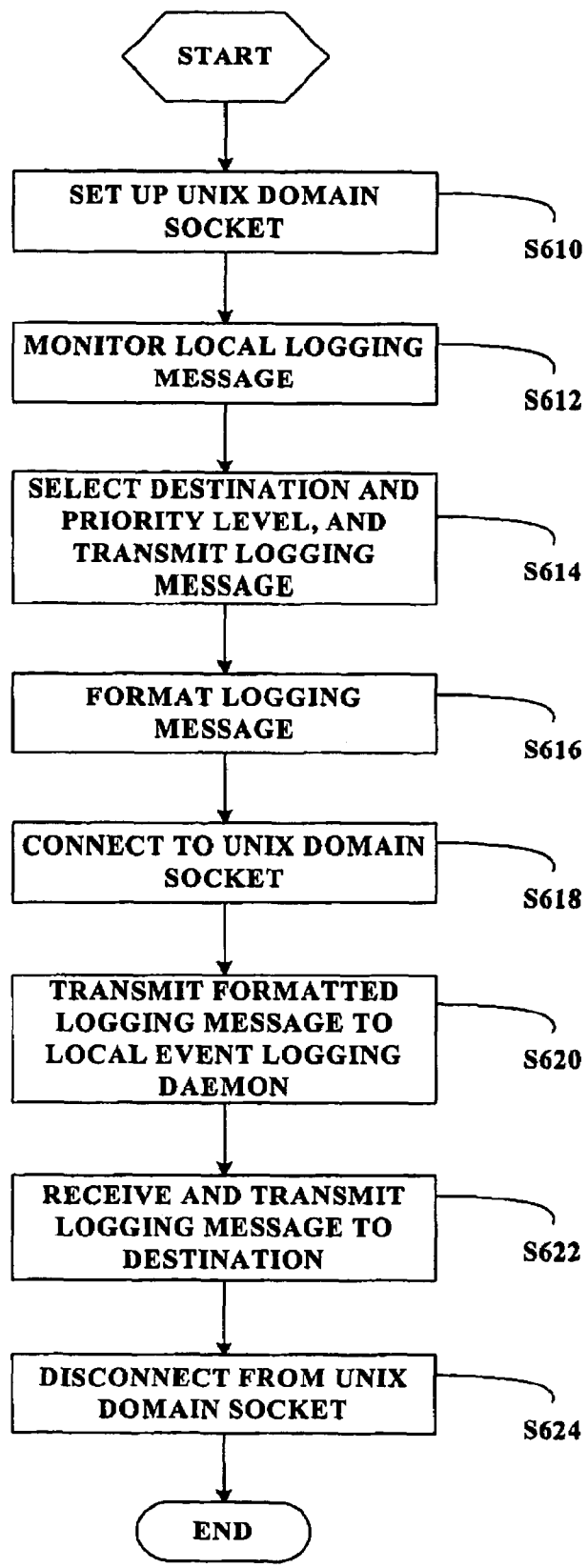
FIG. 2 is a flow chart of a preferred method for logging a local message in the event logging system according to the present invention.

FIG. 2 is a flow chart of a preferred method for logging a local message according to the present invention. The local message source comprises the applications 50 and the hooks 51. At step S610, the local event logging daemon 57 sets up a UNIX domain socket 570. At step S612, the local event logging daemon 57 monitors the local logging message via the UNIX domain socket 570. At step S614, the local message source selects a message destination and a priority level of the logging message, and then transmits the logging message to the event logging library 54. At step S616, the event logging library 54 formats the logging message. At step S618, the event logging library 54 connects to the UNIX domain socket 570. At step S620, the event logging library 54 transmits the formatted logging message to the local event logging daemon 57 via the UNIX domain socket 570. At step S622, the local event logging daemon 57 receives the formatted logging message, and transmits it to the selected message destination according to the configuration file. When a user needs to browse the formatted logging message, the event logging system 5 retrieves the formatted logging message from the selected message destination, and transmits the formatted logging message to the user. At step S624, the event logging library 54 disconnects from the UNIX domain socket 570.

Figure 3:
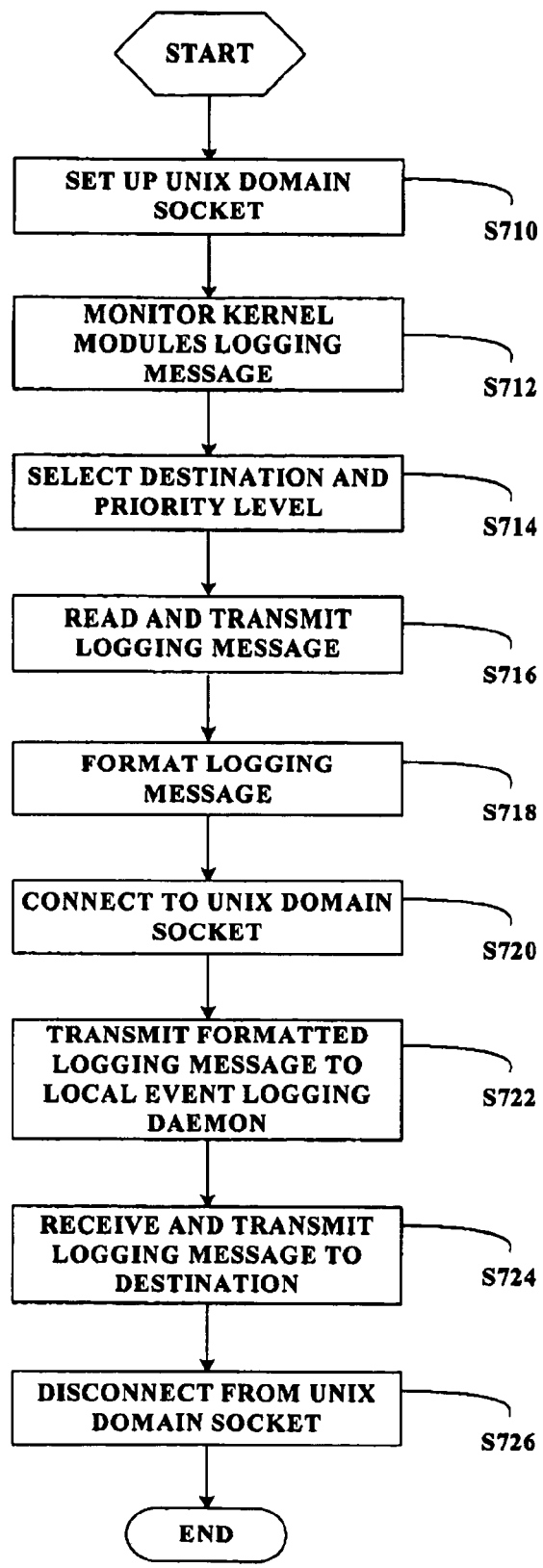
FIG. 3 is a flow chart of a preferred method for logging a message of kernel modules in the event logging system according to the present invention.

FIG. 3 is a flow chart of a preferred method for logging a message of the kernel modules 56 according to the present invention. At step S710, the local event logging daemon 57 sets up a UNIX domain socket 570. At step S712, the local event logging daemon 57 monitors the logging message of the kernel modules 56 via the UNIX domain socket 570. At step S714, the kernel modules 56 select a message destination and a priority level of the logging message. At step S716, the kernel logging daemon 55 reads the logging message generated by the kernel modules 56, and transmits it to the event logging library 54. At step S718, the event logging library 54 formats the logging message according to a predetermined rule. At step S720, the event logging library 54 connects to the UNIX domain socket 570. At step S722, the event logging library 54 transmits the formatted logging message to the local event logging daemon 57 via the UNIX domain socket 570. At step S724, the local event logging daemon 57 receives the formatted logging message, and transmits it to the selected message destination according to the configuration file. When a user needs to browse the formatted logging message, the event logging system 5 retrieves the formatted logging message from the selected message destination, and transmits the formatted logging message to the user. At step S726, the event logging library 54 disconnects from the UNIX domain socket 570.

Figure 4:
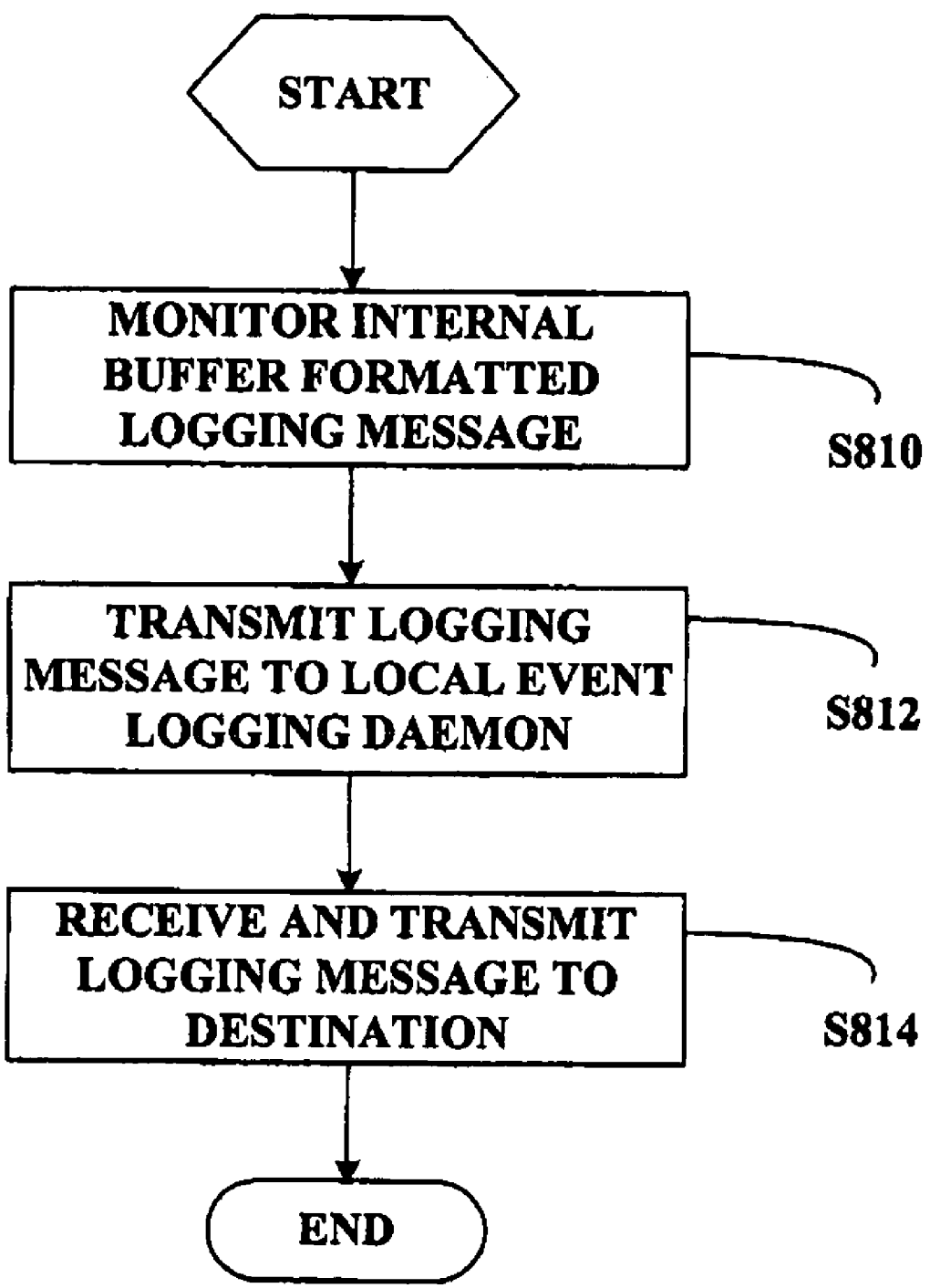
FIG. 4 is a flow chart of a preferred method for logging a formatted message of an internal buffer in the event logging system according to the present invention.

FIG. 4 is a flow chart of a preferred method for logging a formatted message of the internal buffer 59 according to the present invention. At step S810, the local event logging daemon 57 monitors the formatted logging message of the internal buffer 59. At step S812, the internal buffer 59 transmits the formatted logging message to the local event logging daemon 57 directly. At step S814, the local event logging daemon 57 receives the formatted logging message, and transmits it to the message destination according to the configuration file. When a user needs to browse the formatted logging message, the event logging system 5 retrieves the formatted logging message from the message destination, and transmits the formatted logging message to the user.

Figure 5:
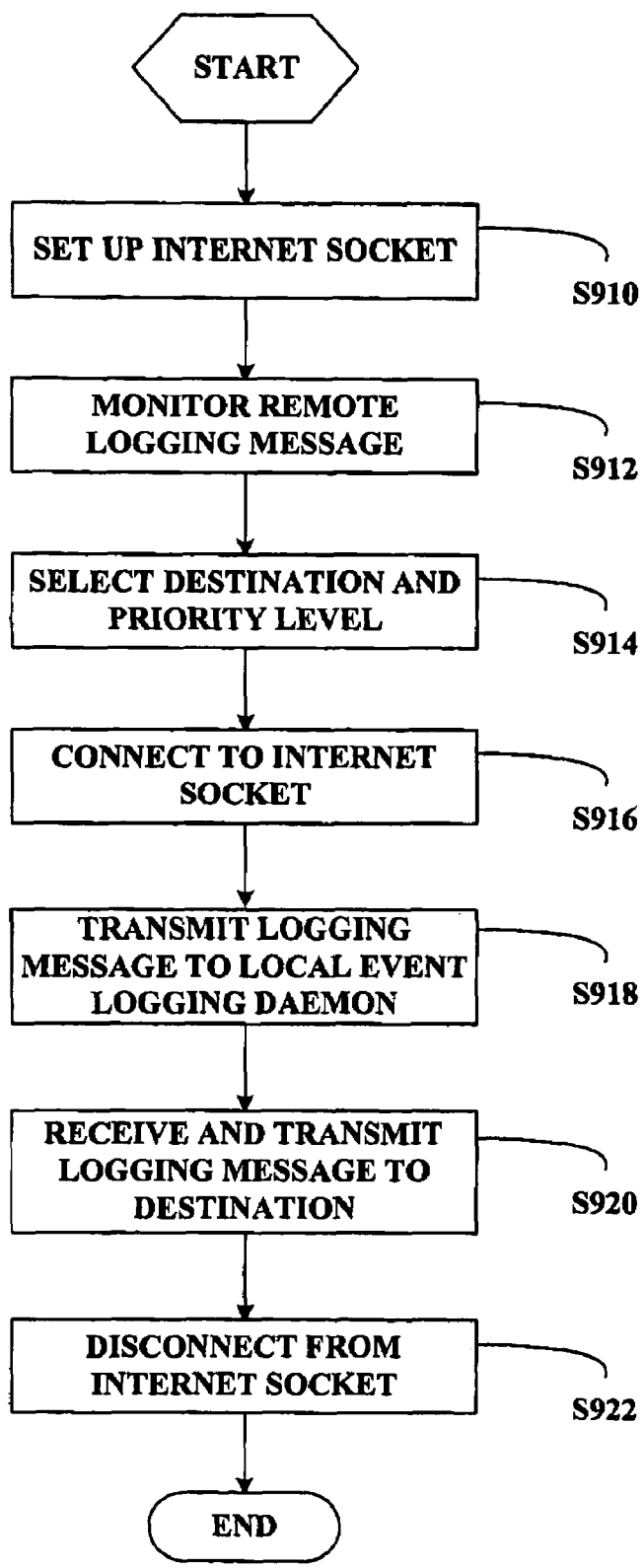
FIG. 5 is a flow chart of a preferred method for logging a remote message in the event logging system according to the present invention.

FIG. 5 is a flow chart of a preferred method for logging a remote message according to the present invention. The remote message source is the remote event logging daemon 58. At step S910, the local event logging daemon 57 sets up an Internet socket 572. At step S912, the local event logging daemon 57 monitors the remote logging message via the Internet socket 572. At step S914, the remote event logging daemon 58 selects a message destination and a priority level of the remote logging message. At step S916, the remote event logging daemon 58 connects to the Internet socket 572. At step S918, the remote event logging daemon 58 transmits the remote logging message to the local event logging daemon 57 via the Internet socket 572. At step S920, the local event logging daemon 57 receives the remote logging message, and transmits it to the selected message destination according to the configuration file. When a user needs to browse the formatted logging message, the event logging system 5 retrieves the remote logging message from the selected message destination, and transmits the remote logging message to the user. At step S922, the remote event logging daemon 58 disconnects from the Internet socket 572.

While a preferred embodiment and preferred methods of the present invention have been described above, it should be understood that they have been presented by way of example only and not by way of limitation. Thus the breadth and scope of the present invention should not be limited by the above-described exemplary embodiment and methods, but should be defined only in accordance with the following claims and their equivalents.

What is claimed is:

1. An event logging system for logging messages, the event logging system comprising:
    at least one message source for generating the messages;
    an event logging library for formatting the messages;
    a local event logging daemon for distributing the messages according to a configuration file that indicates which of said at least one message source generates the message, priority levels of the message, and how to deal with the messages; and
    at least one message destination for receiving the messages;
    wherein the local event logging daemon distributes the messages from said at least one message source to said at least one message destination, wherein the local event logging daemon is configured for dynamically setting up an Internet socket to transmit the messages between a remote event logging daemon and the local event logging daemon.

2. The event logging system as claimed in claim 1, wherein said at least one message source comprises any one or more of an application, a hook, a kernel module, an internal buffer, and a remote event logging daemon.

3. The event logging system as claimed in claim 2, wherein said at least one message destination comprises any one or more of a hook, an internal buffer, a remote event logging daemon, a file system, and a mail system.

4. The event logging system as claimed in claim 2, further comprising a kernel logging daemon for transmitting the messages from said kernel module to the event logging library.

5. The event logging system as claimed in claim 1, wherein the local event logging daemon is provided for dynamically setting up a UNIX domain socket to transmit the formatted messages between the event logging library and the local event logging daemon.

6. The event logging system as claimed in claim 4, wherein the event logging library is provided for transmitting the messages from said application, said hook or the kernel logging daemon to the local event logging daemon.

7. The event logging system as claimed in claim 3, wherein said internal buffer stores the formatted messages transmitted by the local event logging daemon.

8. The event logging system as claimed in claim 7, wherein the local event logging daemon reads the formatted messages stored in said internal buffer.

9. The event logging system as claimed in claim 3, wherein the local event logging daemon distributes the formatted messages to said tile system or said mail system directly.

10. The event logging system as claimed in claim 1, wherein the configuration file is configured so that it can be modified by a user such that the priority levels of the messages are changed in order to ensure logging of all important events.

11. A method for logging messages, the method comprising the following steps:
   (a) at least one message source selecting a message destination, a priority level for each of the messages and transmitting the messages;
   (b) a local event logging daemon receiving the messages;
   (c) the local event logging daemon distributing the messages to at least one message destination according to a configuration file that indicates which of said at least one message source generates the message, priority levels of the message, and how to deal with the message; and
   wherein when said message source is a remote event logging daemon, step (a) further comprises the following steps:
   (a20) the local event logaina daemon setting up an Internet socket;
   (a22) the local event logging daemon monitoring the messages via the Internet socket; and
   (a24) said remote event logging daemon transmitting the messages to the local event logging daemon via the Internet socket.

12. The method as claimed in claim 11, wherein said at least one message source comprises any one or more of an application, a hook, a kernel module, an internal buffer, and a remote event logging daemon.

13. The method as claimed in claim 12, wherein said at least one message destination comprises any one or more of a hook, an internal buffer, a remote event logging daemon, a file system, and a mail system.

14. The method as claimed in claim 13, wherein when said at least one message source of step (a) is said application, said hook or said kernel module, step (a) further comprises the following steps;
   (a10) the local event logging daemon setting up a UNIX domain socket;
   (a12) the local event logging daemon monitoring the messages via the UNIX domain socket;
   (a14) said at least one message source transmitting the messages to an event logging library; and
   (a16) the event logging library formatting the messages.

15. The method as claimed in claim 14, wherein when said at least one message source is said kernel module, step (a14) further comprises the step of a kernel logging daemon transmitting the messages from said kernel module to the event logging library.

16. The method as claimed in claim 15, wherein step (b) further comprises the step of the event logging library transmitting the formatted messages to the local event logging daemon via the UNIX domain socket.

17. The method as claimed in claim 10, further comprising the following step:
   changing the priority levels of the messages by modifying the configuration file in order to ensure logging of all important events.

* * * * *